United States Patent [19]

Williams, Jr.

[11] Patent Number: 4,643,395
[45] Date of Patent: Feb. 17, 1987

[54] VALVE WITH PROTECTED SEATS

[75] Inventor: John B. Williams, Jr., Houston, Tex.

[73] Assignee: Joy Manufacturing Company, Pittsburgh, Pa.

[21] Appl. No.: 800,250

[22] Filed: Nov. 21, 1985

[51] Int. Cl.$^4$ .............................................. F16K 3/16
[52] U.S. Cl. .................... 251/172; 251/175; 251/195; 251/327; 251/328
[58] Field of Search .............. 251/328, 327, 326, 329, 251/172, 175, 193, 195, 196

[56] References Cited

U.S. PATENT DOCUMENTS

| | | | |
|---|---|---|---|
| 3,078,865 | 2/1963 | Estes et al. | 251/328 X |
| 4,067,542 | 1/1978 | Morrison | 251/328 |
| 4,179,098 | 12/1979 | Laitkep et al. | 251/328 X |
| 4,434,967 | 3/1984 | Vanderburg | 251/327 X |

Primary Examiner—Alan Cohan
Assistant Examiner—John S. Starsiak, Jr.
Attorney, Agent, or Firm—Marvin J. Marnock

[57] ABSTRACT

A gate valve 10 of slab gate variety with "floating" seats having means for protecting the seat ring seals and seat pockets in severe operating conditions. Each seat ring (40,41) is provided in its rear face (43,44) with an annular groove (49) coaxial with the ring axis and of a diameter to be located closely adjacent the flow passage (16,17) through the valve and accommodating an O-ring seal (49,50) therein. A second annular groove (51) is formed in the outer cylindrical surface (40a, 41a) of the ring near the front face (43,44) of the ring and accommodates an O-ring seal therein. The two O-ring seals (49,52) and (50,51) by their location establish a "trapped" volume chamber (55) behind the seat ring and seat pocket (32,33) which protects and isolates the seat pocket from corrosive ladings and solids deposition. Each seat ring is provided with an unobstructed "bleed" passage (56) which extends from the front face of the ring to the rear face of the ring or other locations so as to open to the "trapped" chamber whereby excessive pressure "build-up" in the "trapped" chamber as could damage the seat ring and seals or impair valve operation is precluded.

4 Claims, 2 Drawing Figures

VALVE WITH PROTECTED SEATS

BACKGROUND OF THE INVENTION

This invention relates generally to valves, and more particularly to a through conduit gate valve having a slab gate member as the valve element and cooperating seat members which form a seal on both the upstream and downstream sides of the gate member.

Gate valves, particularly through conduit gate valves, which when open present an unbroken smooth wall conduit for uninterrupted passage of flow therethrough, are widely used because of their desirable flow characteristics. Generally, gate valves of the slab gate variety, are provided with two floating seats, so that as the gate moves across the conduit opening, the floating action of the gate and seats makes a total pressure-actuated seal which hold tight on both the upstream and downstream sides of the valve. However, in certain severe conditions, such as in geothermal applications where the effluent contains considerable amounts of minerals and foreign matter which tend to precipitate out to form sediment and scale deposits, the seats tend to become "frozen" in place by the formation of such precipitation. When this occurs, the seals are prevented from floating back into the seat pockets. Accordingly, when the valve is moved to the closed conditon, high contact loads are created between the gate and seats which may be assisted by shirnkage of valve components induced by temperature cooling changes as result in galling or scratching of the sealing surfaces and the requirement of a very high operating torque. Also, in applications with corrosive fluids, the back of the seat pocket becomes exposed to the corrosive fluid that may, in time, cause its deterioration to such a degree that the elastomer seals of the seat assembly will no longer function.

It is a primary object of the invention, therefore, to provide a gate valve with seat assemblies and seat pockets provided therefor which are protected from the debilitating effects of corrosive and fouling fluids ladings.

It is another object to provide a gate valve of the slab gate variety having floating seats for establishing upstream and downstream seals wherein the seat pockets are protected from solids depositions and accumulations and excessive pressure build-up behind the seats as would impair the operation of the valve.

SUMMARY OF THE INVENTION

The invention is a gate valve having a unique valve seat structure for adapting the valve for reliable long service operation in applications involving corrosive ladings or fouling fluids such as in geothermal applications. The valve seat structure is positioned in the annular seat pocket which is formed about the flow conduit and adjacent the valve chamber on both the upstream and downstream sides of the slab gate of the valve. The valve seat structure comprises a metallic seat ring which is adapted to fit snugly within the seat pocket with small clearance and is provided with an axial dimension which exceeds the depth of the seat pocket. The seat ring in its rear face is formed with an annular groove in coaxial relation with the ring axis for accommodating a resilient O-ring therein. The groove is of a diameter slightly larger than the inner diameter of the seat ring so as to be located closely adjacent the flow passage through the valve. In its outer cylindrical peripheral surface, the seat ring is formed with another annular groove near the front face of the seat ring for accommodating a second resilient O-ring. The two O-ring seals being of different diameters and located adjacent the rearward inner edge of the seat ring and the forward outer edge of the seat ring, respectively, result in a "trapped" volume chamber in the seat pocket behind the seat ring which effectively protects and isolates the seat pocket from corrosive ladings and solids deposition. To protect against an excessive pressure build-up in the "trapped" chamber behind the seat ring which could rupture the O-ring seals, cause seat damage, and impose the requirement for very high operating torque, a small unobstructed "bleed" passage is provided to extend from the back face of the seat ring to the front face thereof.

BRIEF DESCRIPTION OF THE DRAWINGS

In the accompanying drawings which form part of the specification and are to be read in conjunction therewith:

Referring to the drawings in greater detail, FIG. 1 illustrates a through conduit gate valve 10 made in accordance with the present invention. The gate valve 10 is of the type having a rising valve stem 11 and a slab gate 12 for opening and closing the valve. The valve 10 includes a valve housing 13 which defines a valve chamber 14 and is provided with a bore 15 forming aligned inlet and outlet flow passages 16, 17. Flanges 18 formed at the ends of the valve body 10 provide means for connecting the valve in a flowline in conventional manner. The gate member 12 in the valve chamber 14 is mounted for sliding reciprocating movement transversely across the bore 15 to open or close the valve. The gate member 12 is connected at its upper end to the valve stem 11 which extends through a valve bonnet 20 affixed to the valve body 10. The bonnet is mounted atop the valve housing 13 and bolted thereto by a plurality of bolts or studs 22 which pass through radial flange 23 at the lower end of the bonnet 20 and are received in threaded bores in the top of the valve body. The bonnet 20 closes off the valve chamber 14 and is provided with an opening which receives the valve stem 11 therethrough and accommodates a valve stem packing 24.

Figure 2:
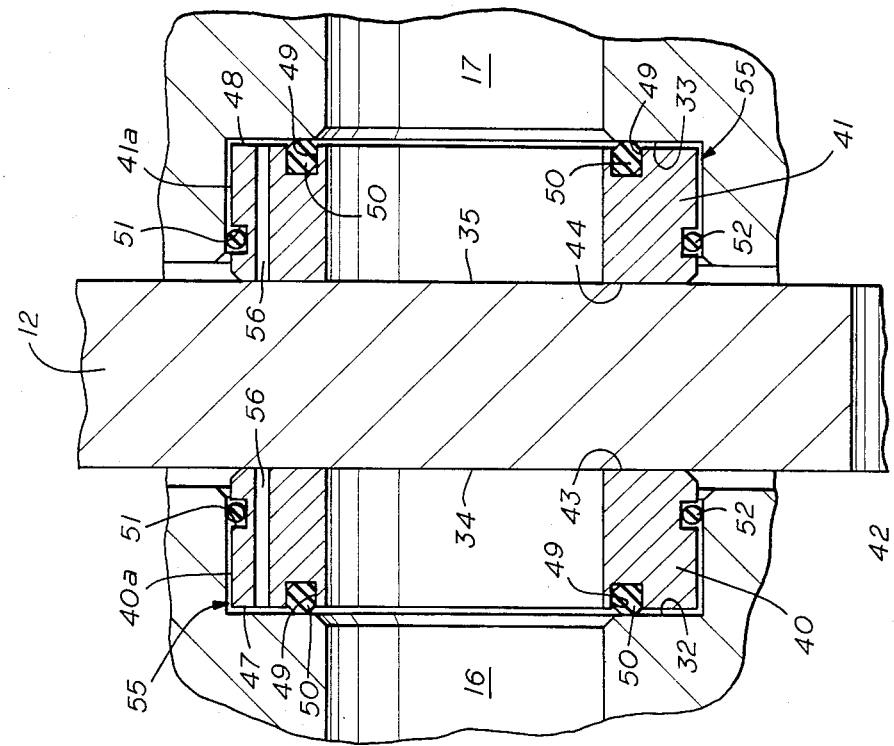
FIG. 2 is an enlarged sectional view through the seat ring of the invention.

A bevel gear operator 26 is mounted atop the bonnet 20 and is operatively associated with a handwheel 30 by suitable connection as well known in the art such that rotation of the handwheel will move the stem 11 in the axial direction to raise or lower the gate 12.

The inlet and outlet flow passages 16, 17 terminate in hub portions 31, 31 which extend into the valve chamber 14. Annular recesses are machined in the ends of the hub portions 31 to form annular seat pockets 32, 33, each of which surrounds the bore 15 in concentric surrounding relation thereto.

In either the open or closed condition of the valve, the gate member 12 extends transversely across the bore 15. The gate member 12 is provided with parallel planar sealing faces 34, 35 on the sides thereof which face the flow passages 16, 17 and extend perpendicularly thereto. As is well known, the sealing faces 34, 35 are adapted to cooperate with and sealingly engage annular set members 40 and 41 which are disposed in the seat pockets 32, 33, respectively. A port 42 is formed in the lower portion of the gate 12 and is provided with identical diameter and configuration as the flow passages 16, 17.

Figure 1:
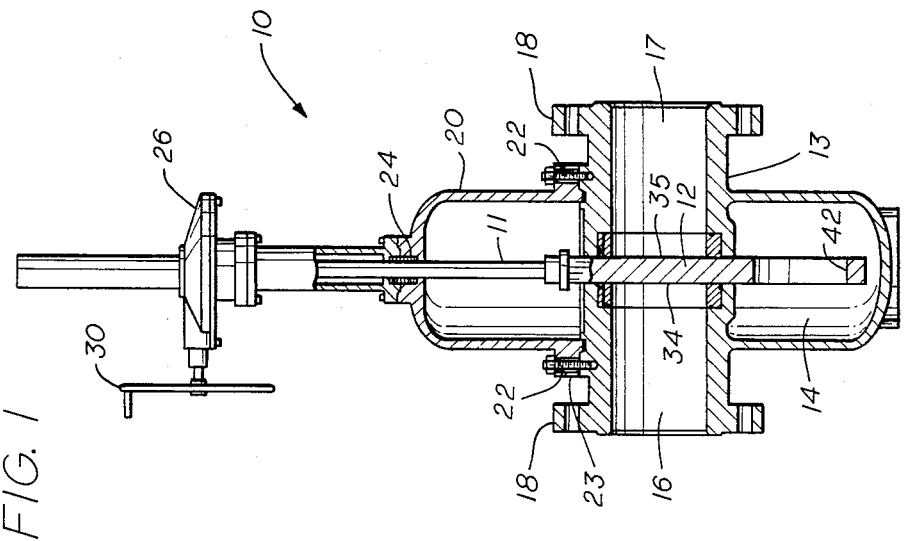
FIG. 1 is a longitudinal view, partly in section, of a gate valve with the unique valve seat structure of this invention.

As shown in FIG. 1, the valve 10 is shown in closed condition, wherein the gate 12 in its lowermost position extends across the bore 15 and closes off the flow passages 16, 17. However, in the open condition of the valve, which condition is not shown in the drawings, the gate 12 is in a raised position wherein the port 42 is in registry with the passages 16, 17 and the open valve presents an unbroken smooth wall conduit for uninterrupted flow therethrough.

As best seen in FIG. 2, each seat ring 40, 41 is provided with an axial length which is greater than the depth of the seat pocket in which it is received whereby a portion of the seat ring protrudes into the valve chamber 14. It is also provided with an outer diameter which is slightly smaller than that of the seat pocket so that the seat ring is snugly received therein with small clearance in a "floating" relation therewith. The front faces 43, 44 of the seat rings 40, 41, respectively, are highly polished surfaces which are adapted to sealingly engage the planar sealing surfaces 34, 35 of the gate 12. As is readily apparent to those skilled in the art, when the gate 12 is in its closed position, line pressure will act on the gate 12 to urge it in the downstream direction so that a tight seal is obtained between the gate 12 and the downstream seat ring 41. Also, due to line pressure in back of the upstream seat ring 40, the "floating" seat ring 40 is pressure activated against the gate 12 to form an effective seal therewith.

To provide a more effective seal under certain conditions, it may be desirable to provide each seat ring 40, 41 with an annular TEFLON insert in the front face of the ring. As is well known, such an insert is secured in an annular groove concentric with the axis of the seat ring and extends slightly beyond the plane of the sealing face of the seat ring to form an annular ring of sealing contact with the gate member. Such inserts are not shown in the embodiment of the invention illustrated in the drawing, but it is to be understood that such may be provided if desired.

To adapt the valve of the present invention for reliable service under severe operating conditions, as in applications involving corrosive ladings or fouling fluids such as geothermal applications, each seat ring 40, 41 is provided in its rear face 47, 48, respectively, with an annular groove 49 formed in coaxial relation with the ring axis and accommodating a resilient O-ring 50 therein. The groove 49 is of a diameter slightly larger than the inner diameter of the seat ring so as to be located closely adjacent the bore 15 and the flow passage through the valve.

In its outer cylindrical surface 40a, 41a, each seat ring is formed with another annular groove 51 near the front face of the seat ring for accommodating a recent resilient O-ring 52. The two O-rings of the seat ring, being of different diameters and located adjacent the rearward inner edge of the seat ring and the forward outer edge of the seat ring, respectively, result in a "trapped" volume chamber 55 in the seat pocket behind the seat ring. The two O-rings therefore operate to isolate and protect the walls of the seat pocket from corrosive ladings and solids deposition. Accordingly, when the valve is installed in a flowline which carries "fouling" fluids as formed geothermal wells, the seat rings will retain their ability to "float" and not become "frozen" in place. The problems resulting from the high contact loads which are created between the gate and seats in the event of "frozen" seats, such as galling and scratching of the sealing surfaces of the gate and seats and the high torques required for valve operation are thus avoided. Also, in applications involving corrosive ladings, the protected seat pockets will not be caused to deteriorate to the degree that the elastomer O-ring seals could no longer function.

A further feature of the invention is that each seat ring 40, 41 is provided with a small "bleed" passage 56 which extends from the front face of the seat ring, such as the front face 43 of seat ring 40 to the rear face 47 thereof. The "bleed" passage precludes any build-up of excessive fluid pressure in the "trapped" volume chamber between the seat ring and the walls of the seat pocket which is sealed off by the two O-ring seals carried on the seat ring. Without such a "bleed" passage for relieving fluid pressure, excessive pressure could rupture or otherwise damage the O-ring seals or create undesirably high contact pressure between the seat ring and gate. It is important, of course, that the "bleed" passage 56 be unobstructed. As shown in FIG. 2, it is extends parallel to the axis of the seat ring but it is important only that it extend from the front face of the ring to a point on the outer surface of the ring between the two O-rings.

It will therefore be seen that the seat assembly of the present invention is particularly adapted for use with gate valves of the slab gate variety. It is adapted for use with a wide variety of valve body styles, and with valves having rising stems or non-rising stems. Since the seats are identical on the "upstream" and "downstream" sides, the valve is also bi-directional. A typical diameter for a "bleed" passage is in the order of three-sixteenths inches or 4 to 5 millimeters and the number of such "bleed" passages might be more than one.

It is also to be understood that the foregoing description of a preferred embodiment of the invention has been presented for purposes of illustration and description and is not intended to limit the invention to the precise form disclosed. For example, as previously stated, the front faces of the seat rings might be provided with annular TEFLON inserts as sealing elements or the O-ring seals might be other than O-rings. The size and number of "bleed" passages might also be other than described. It is to be appreciated therefore, that changes may be made by those skilled in the art without departing from the spirit of the invention.

What is claimed is:

1. A gate valve comprising a valve body having a valve chamber and an interior surface defining said valve chamber, inlet and outlet flow passages which intersect and communicate with the chamber and a pair of internal seat recesses formed in the valve body about the flow passages with one of said recesses in concentric surrounding relation to the inlet flow passage and the other of said recesses in concentric surrounding to the outlet flow passage, each said recess opening to said chamber and defined by an annular bottom end wall residing in a plane disposed substantially radially to the axis of the flow passage and having a circumferential cylindrical side wall;

a pair of valve seats received one within each of said seat recesses;

a gate member mounted in the valve body for movement between open and closed positions relative to said flow passages to control the flow of fluid through said flow passages, said gate member having parallel sealing faces adapted for fluid tight sealing engagement with said valve seats each said valve seat comprising a metallic seat ring provided with an axial dimension slightly greater than the depth of the recess as measured from the annular bottom end wall of the recess to the interior surface defining said chamber and having an annular rear face disposed in juxtaposition to the bottom end wall of its seat recess, in annular planar front face disposed in juxtaposition to the gate member, an innermost cylindrical wall, a circumferential cylindrical outer wall which is the wall outermost from the ring axis, an annular back seal groove in said rear face of each said seat ring in coaxial relation with the ring axis and of a diameter slightly larger than the inner diameter of the seat ring so as to be located adjacent the flow passage and the rearward inner edge of the seat ring as defined by the intersection of the annular rear face and said innermost cylindrical wall;

a first annular sealing member disposed within said back seal groove and adapted to provide a fluid tight seal with the bottom end wall of the seat recess, each said seat ring having a circumferential annular groove in said circumferential cylindrical outer wall of the seat ring located nearer the front face than to the rear face thereof;

a second annular sealing member disposed within said circumferential annular groove and adapted to provide a fluid tight seal with the cylindrical side wall of the recess, and bleed passage means in the seat ring extending from said planar face of the ring of the rear face of the ring at a location intermediate the back seal groove and the circumferential annular groove whereby excessive fluid pressure between the seat ring and seat recess is precluded.

2. A gate valve as described in claim 1 wherein said first and second annular sealing members are elastomer O-rings.

3. A gate valve as described in claim 1 wherein said bleed passage means is an unobstructed bore which extends from the front face of the seat ring and opens at the rear face thereof.

4. A gate valve as described in claim 1 wherein said gate member is a slab gate element having a port therethrough which is disposed in registry with the inlet and outlet flow passages of the valve when the valve is open.

* * * * *